United States Patent [19]

Wang

[11] 4,440,414

[45] Apr. 3, 1984

[54] FOLDABLE BICYCLE

[76] Inventor: Fu-Chow Wang, 4 Fl., 17-3, La. 113, Shia Men St., Taipei, Taiwan

[21] Appl. No.: 251,040

[22] Filed: Apr. 6, 1981

Related U.S. Application Data

[63] Continuation-in-part of Ser. No. 103,917, Dec. 17, 1979, abandoned.

[51] Int. Cl.³ .............................................. B62K 15/00
[52] U.S. Cl. ..................................... 280/287; 280/278; 292/139; 301/112; 301/113; 403/324
[58] Field of Search ............... 280/287, 278; 403/324, 403/316, 317; 70/233; 292/113, 139, 150, 167, DIG. 31, DIG. 49; 301/112, 113, 120

[56] References Cited

U.S. PATENT DOCUMENTS

| | | | |
|---|---|---|---|
| 1,584,568 | 5/1926 | Clark | 280/278 |
| 3,791,672 | 2/1974 | Pera | 280/287 |
| 3,990,717 | 11/1976 | Best | 280/278 |
| 4,026,573 | 5/1977 | Richardson | 280/278 |
| 4,033,627 | 7/1977 | Morroni | 280/288 X |
| 4,067,589 | 1/1978 | Hon | 280/287 X |
| 4,170,369 | 10/1979 | Strutman | 280/288 X |
| 4,182,522 | 1/1980 | Ritchie | 280/287 X |

FOREIGN PATENT DOCUMENTS

| | | | |
|---|---|---|---|
| 77345 | 2/1949 | Czechoslovakia | 280/278 |
| 538270 | 3/1922 | France | 280/288 |
| 52469 | 12/1941 | Netherlands | 280/287 |
| 1112828 | 5/1968 | United Kingdom | 280/287 |

Primary Examiner—Joseph F. Peters, Jr.
Assistant Examiner—Mitchell J. Hill

[57] ABSTRACT

The present invention pertains to a foldable bicycle including a main frame comprised of a front frame portion and a rear frame portion, a handlebar structure, a removably, adjustable seat structure, and two removable wheels. The two wheels include a front wheel and a rear wheel both of which are removably mounted to the bicycle frame by quick-release lock mechanisms. Upon removing the bicycles adjustable seat structure and the front wheel and rear wheel, the main frame may be folded by rotating the front frame portion oppositely with respect to the rear frame portion. Upon such folding, the two frame portions form a triangularly shaped unit which lies in three parallel planes.

21 Claims, 42 Drawing Figures

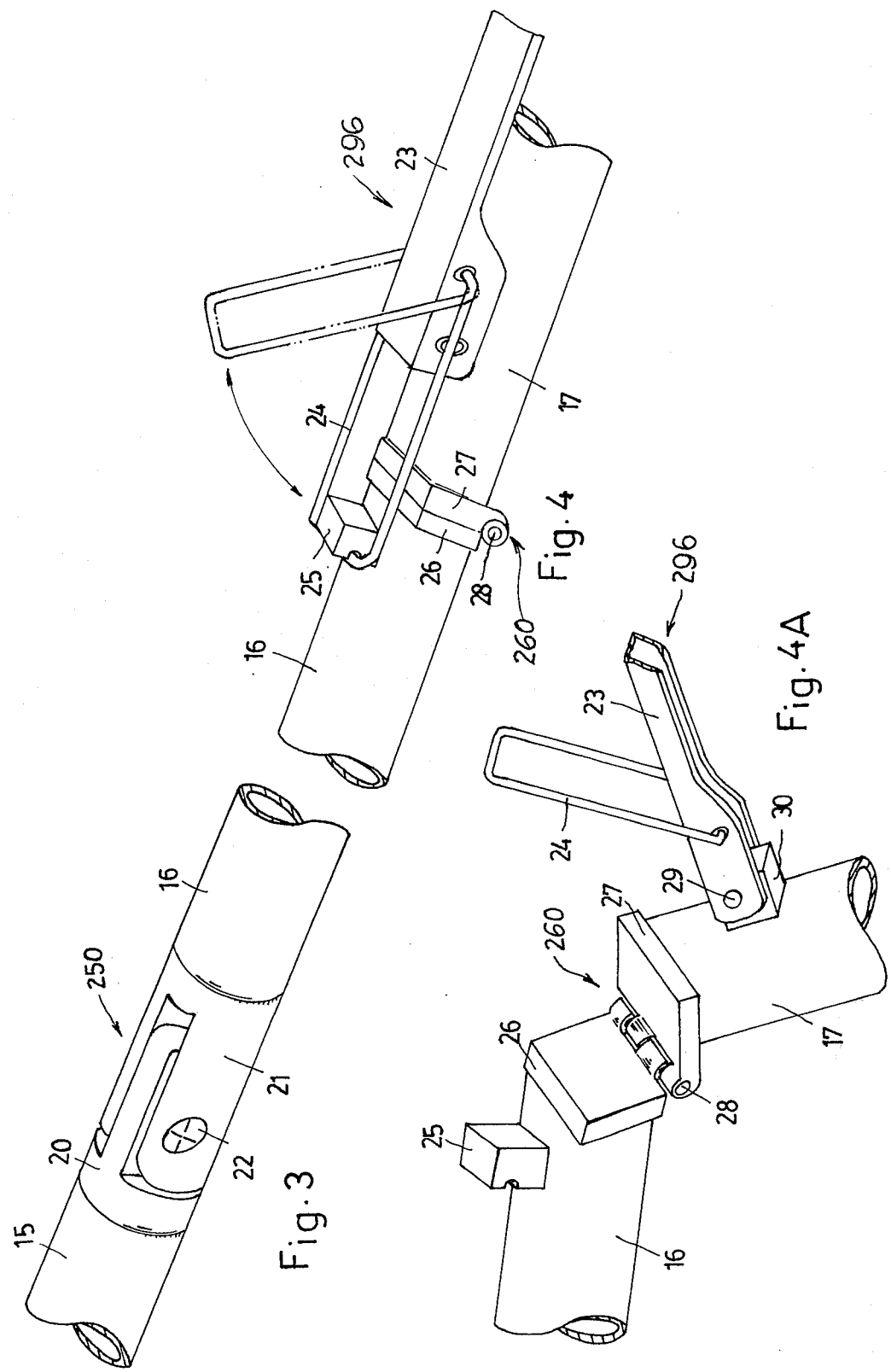

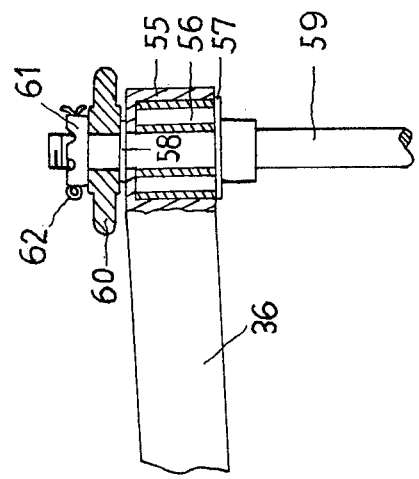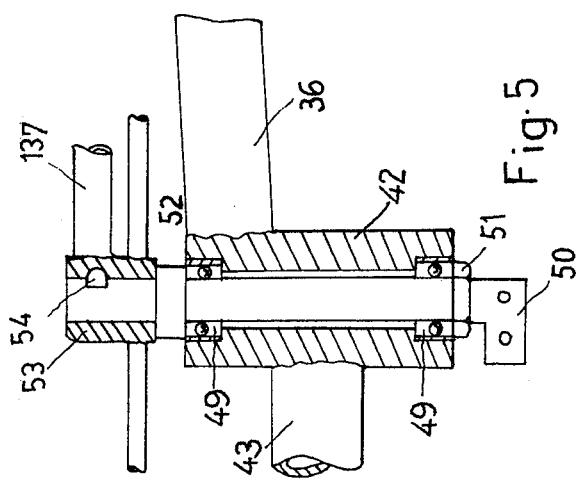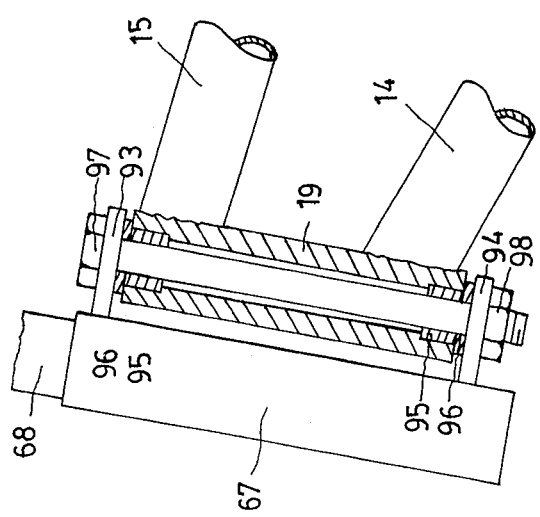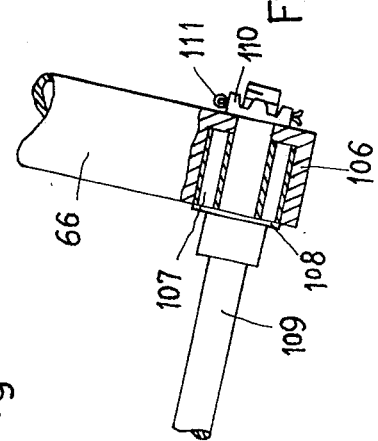

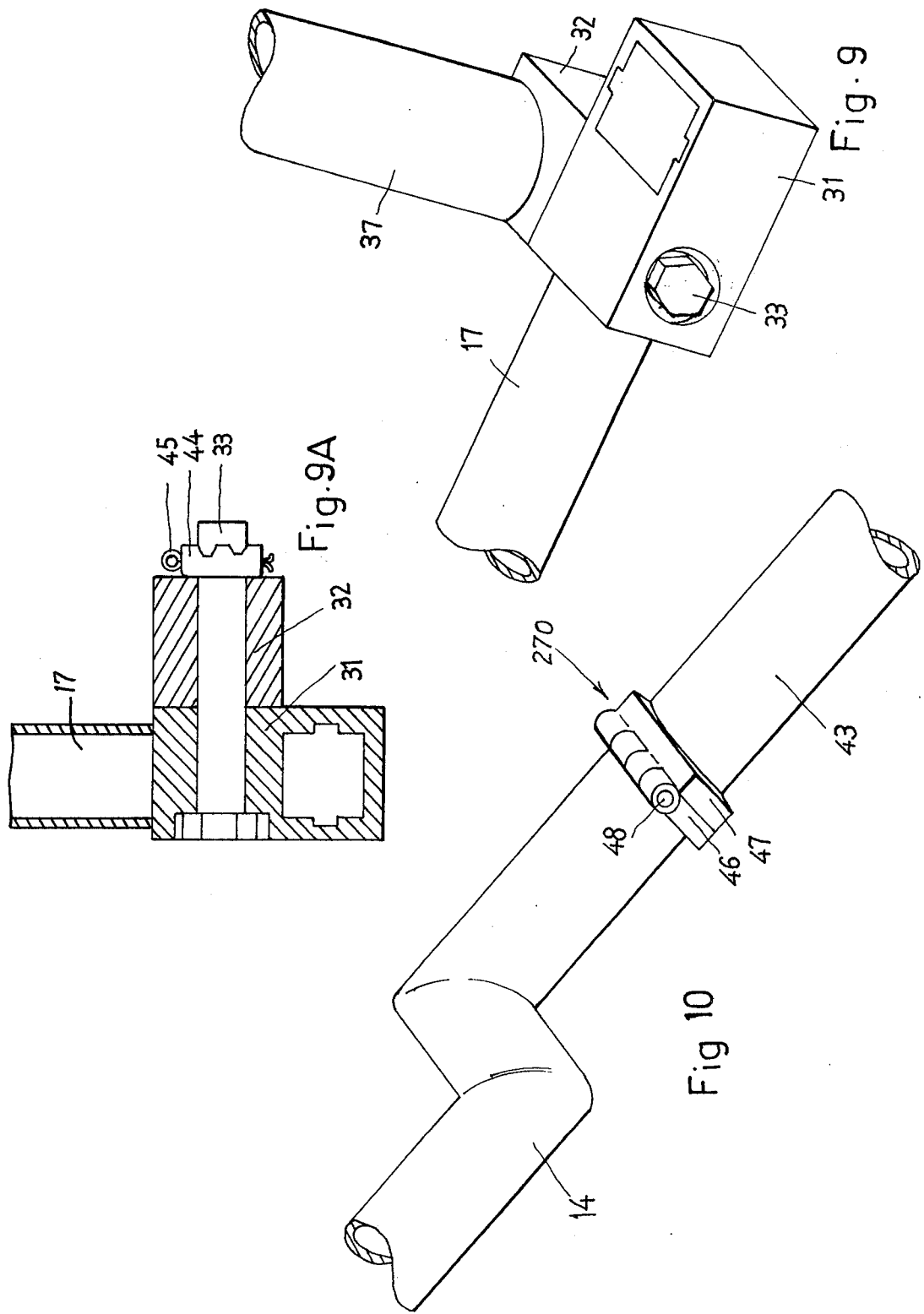

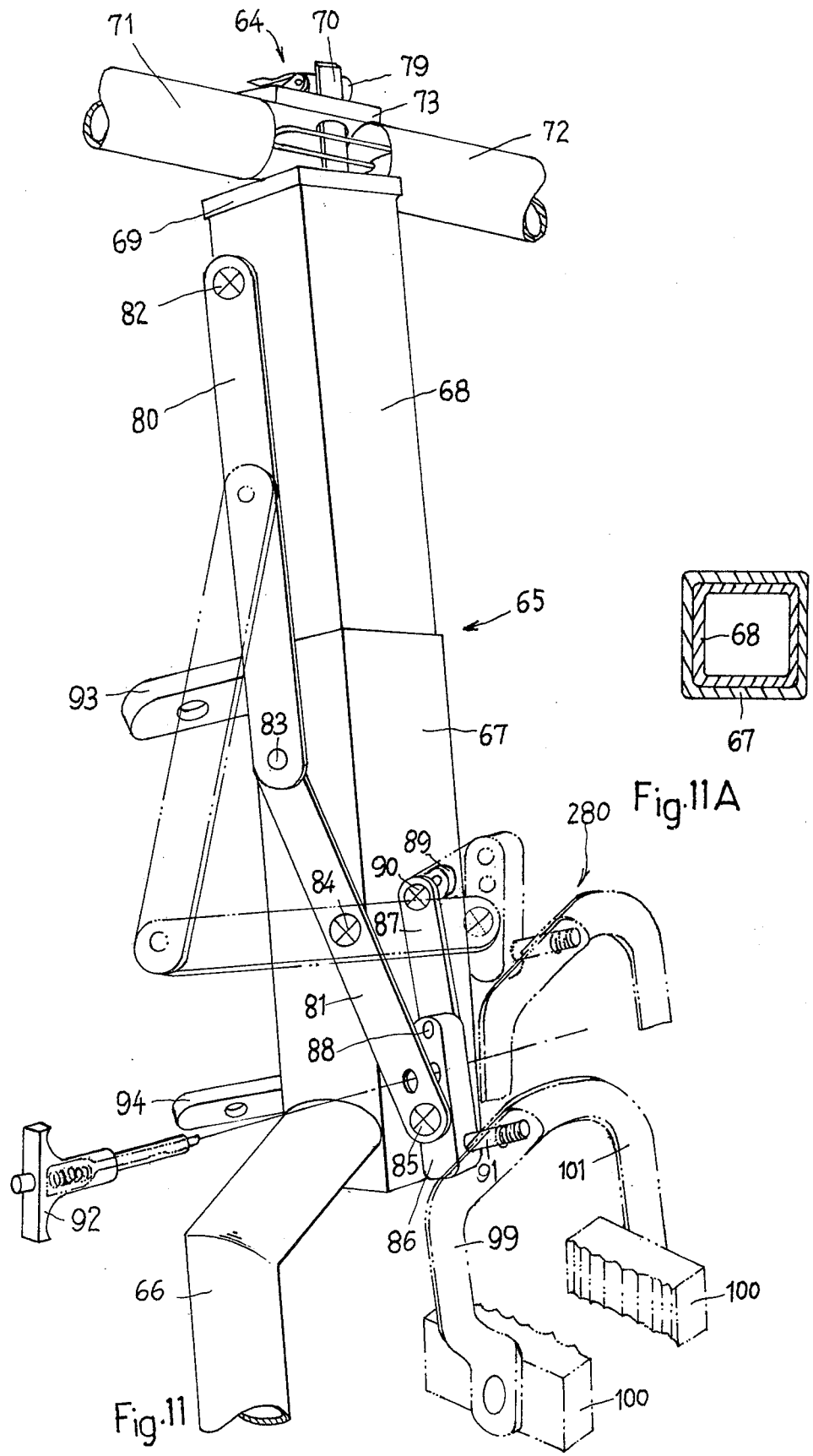

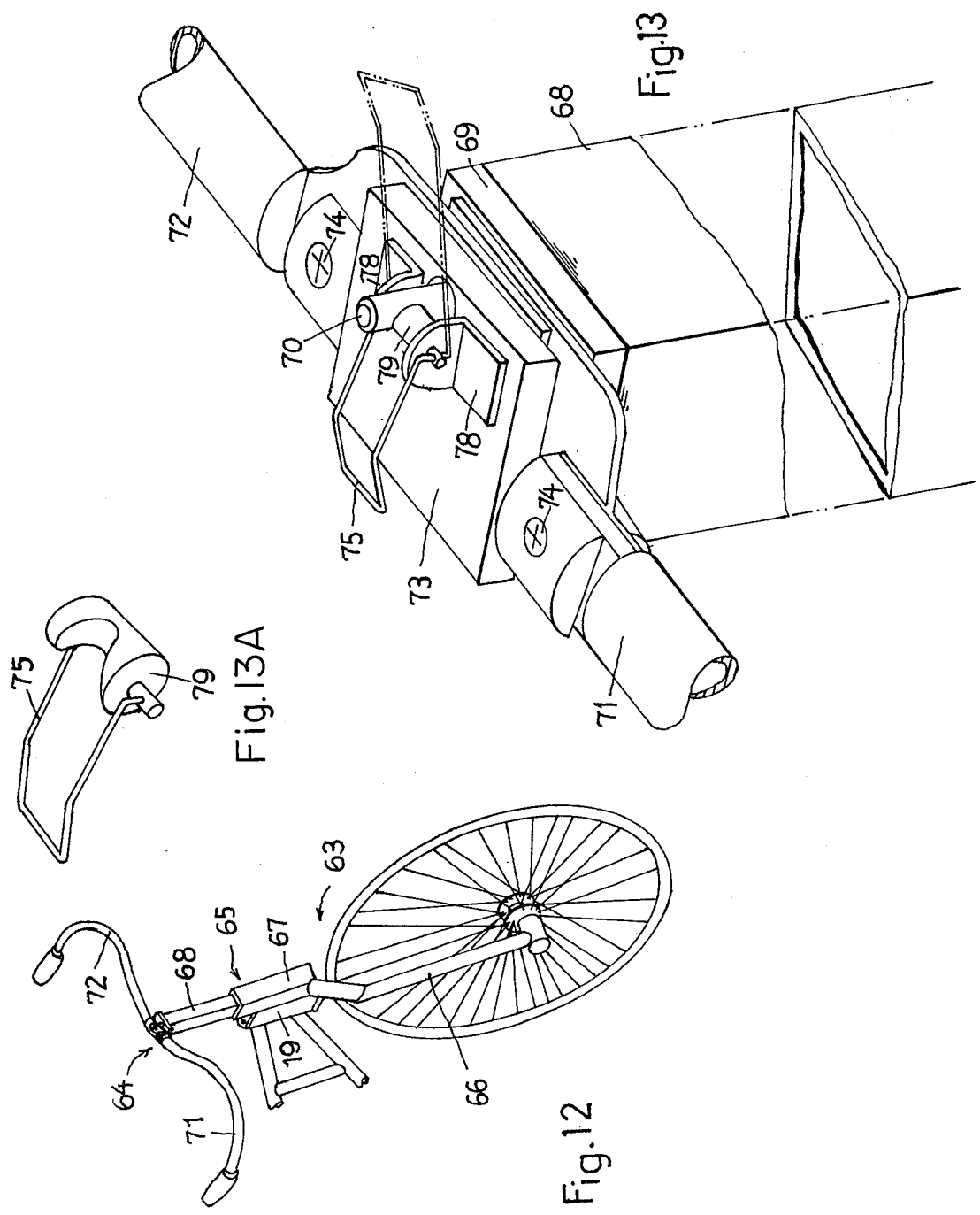

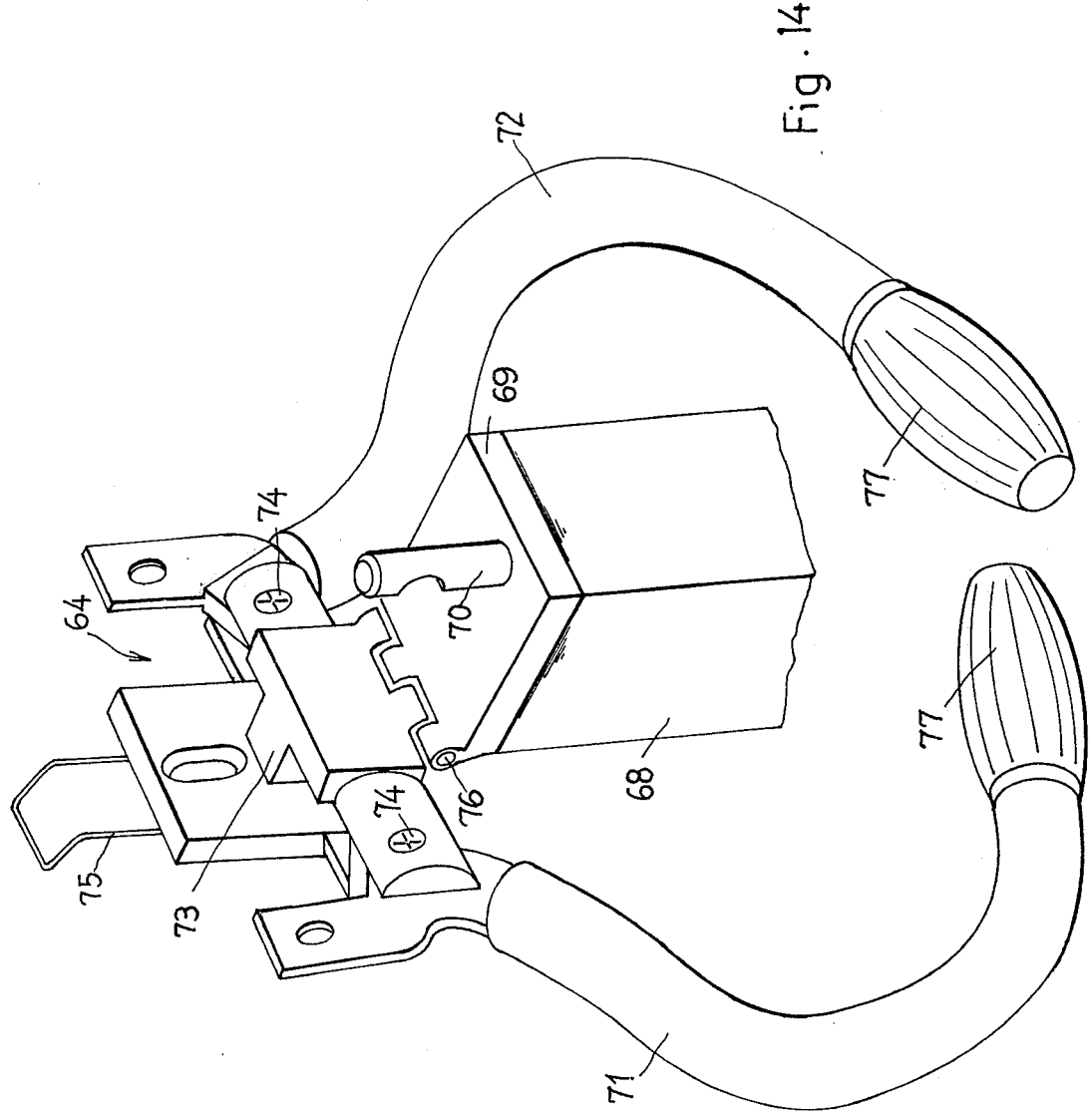

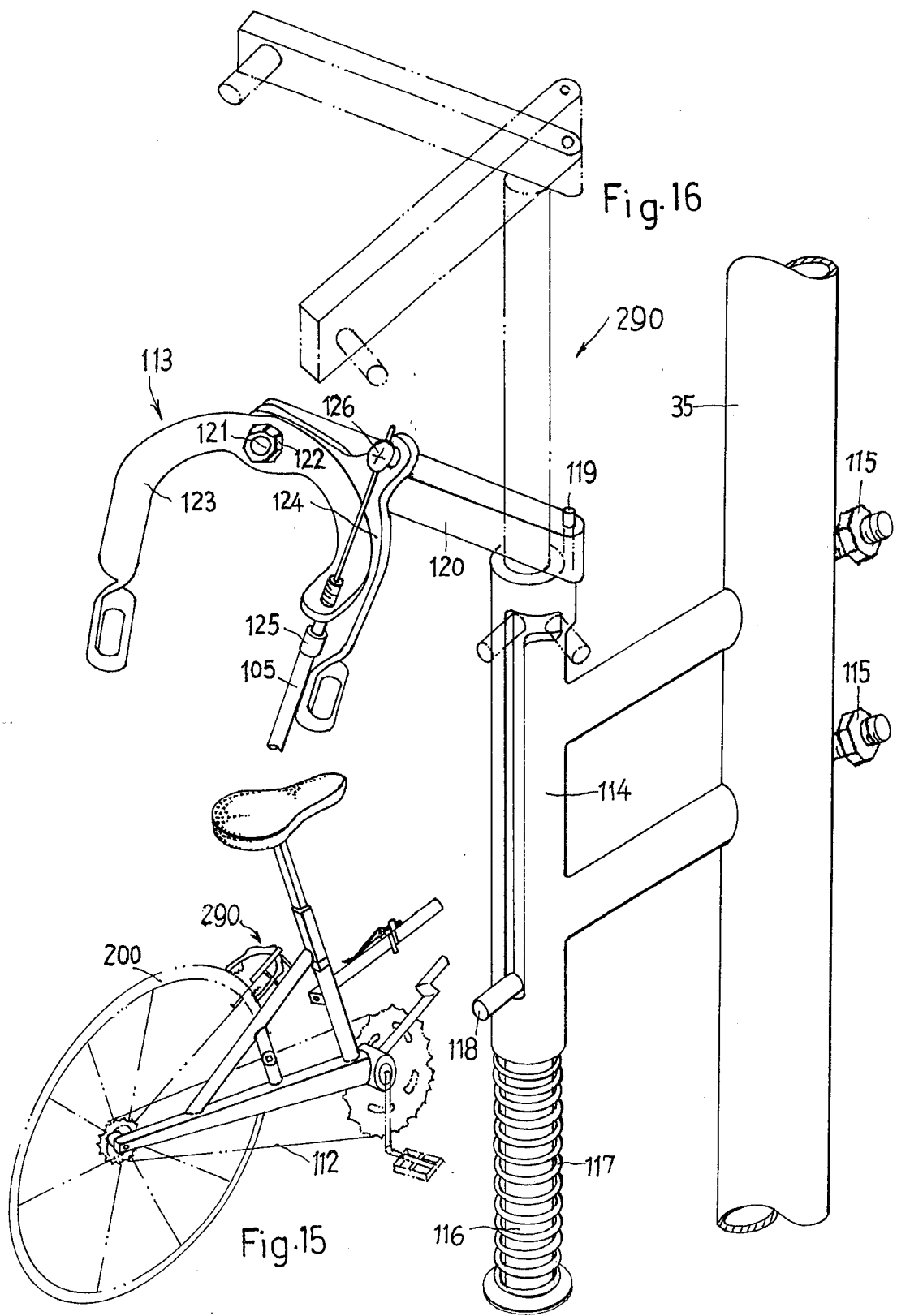

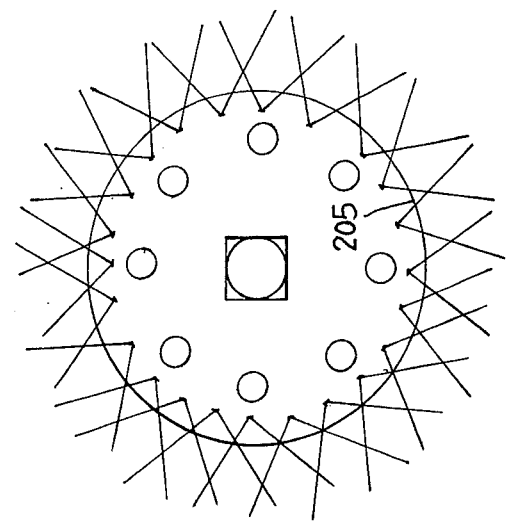
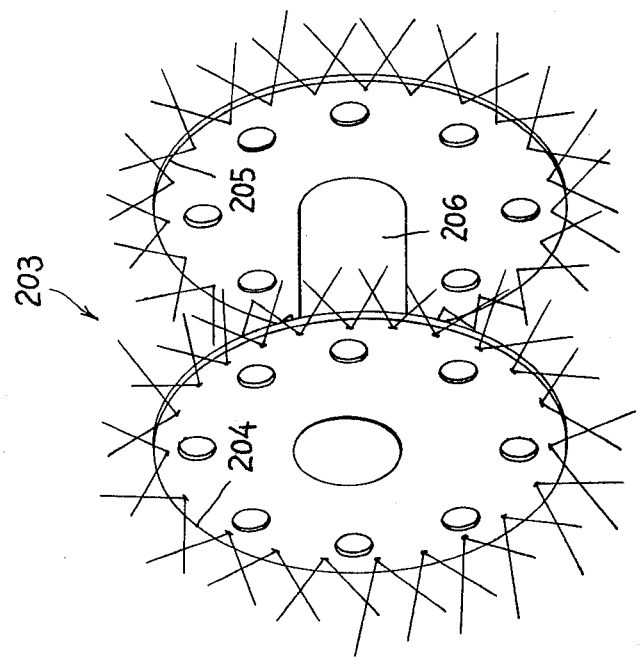

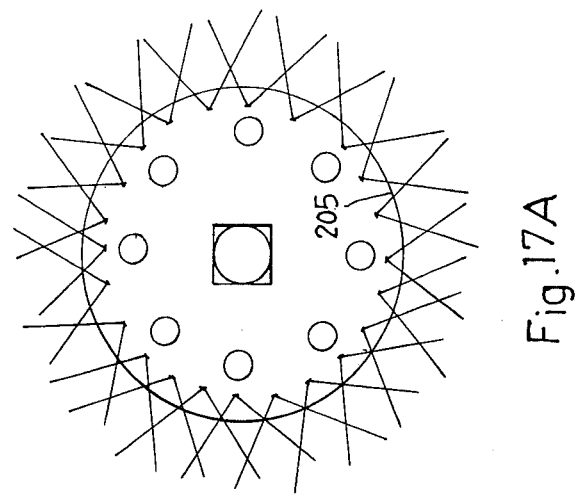
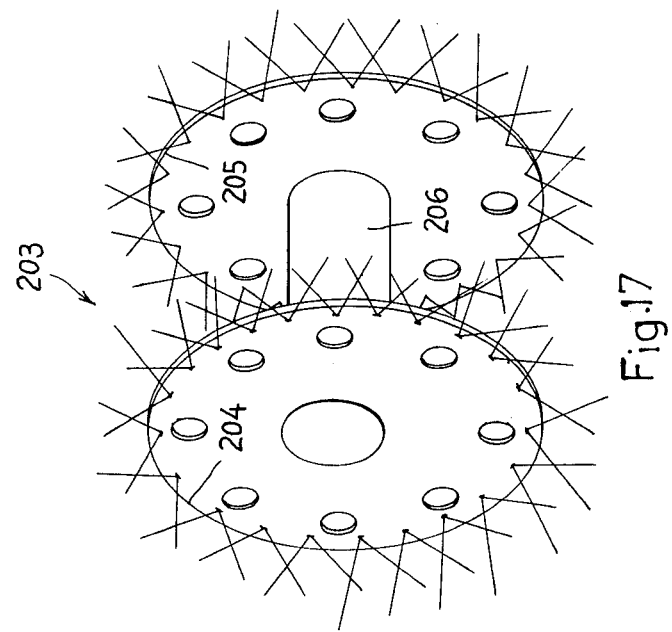

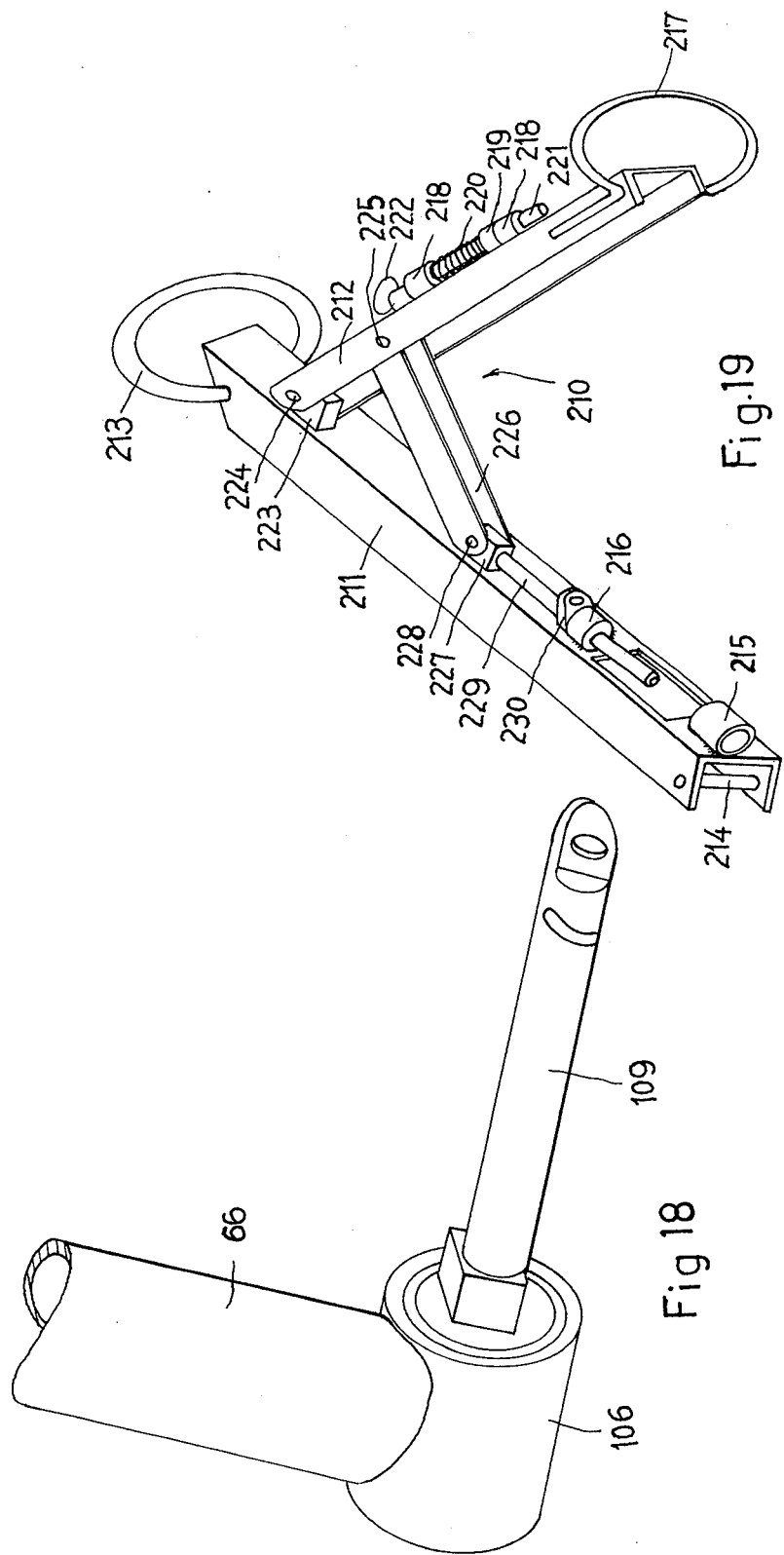

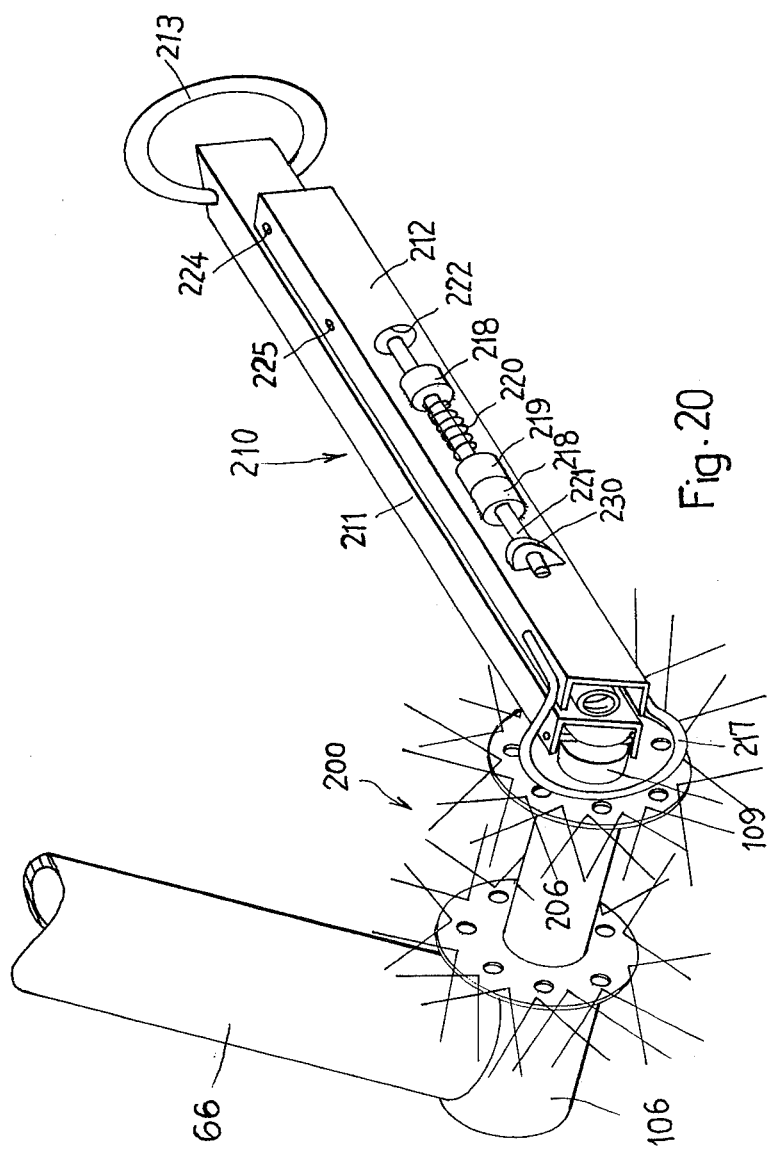

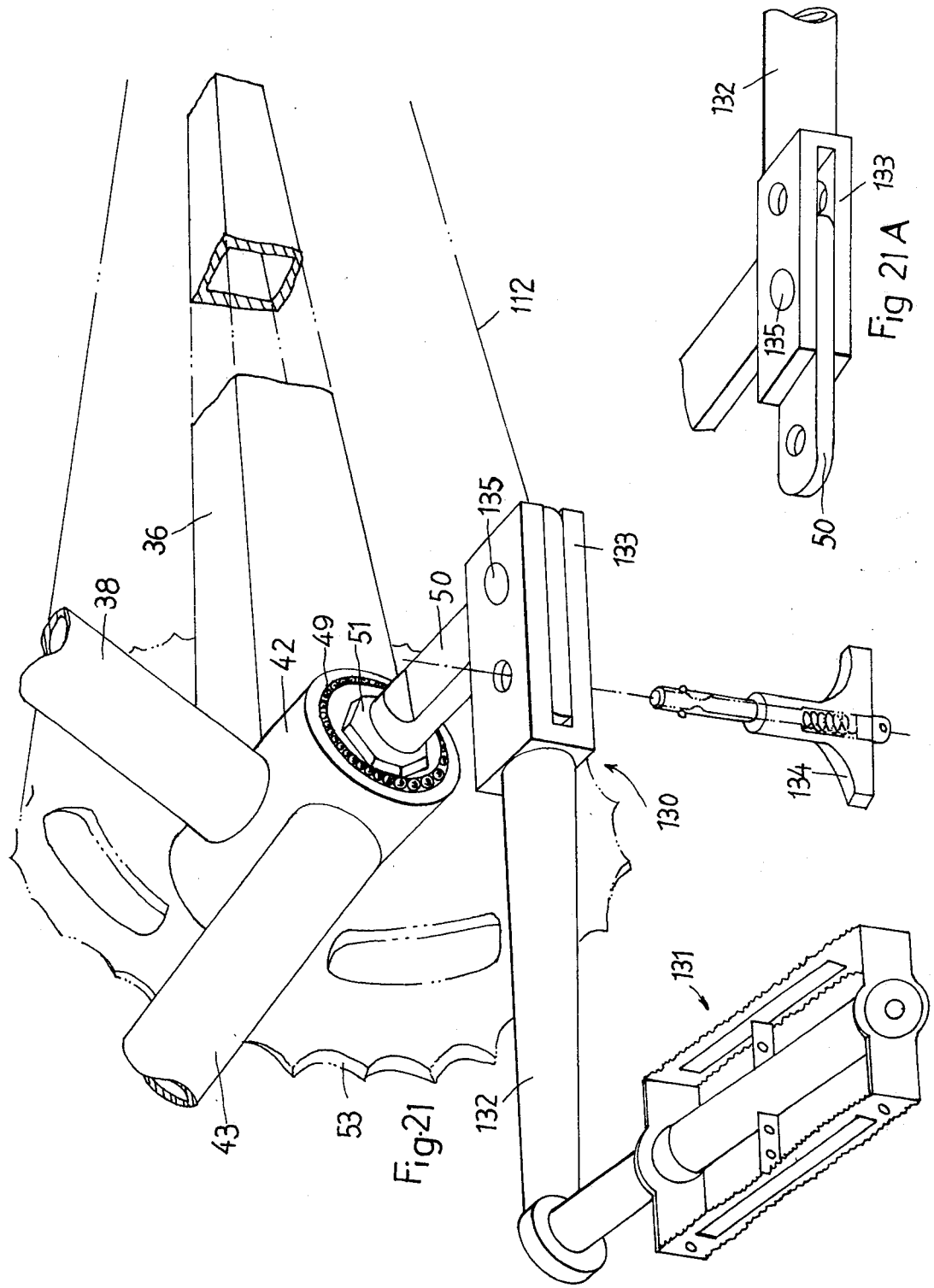

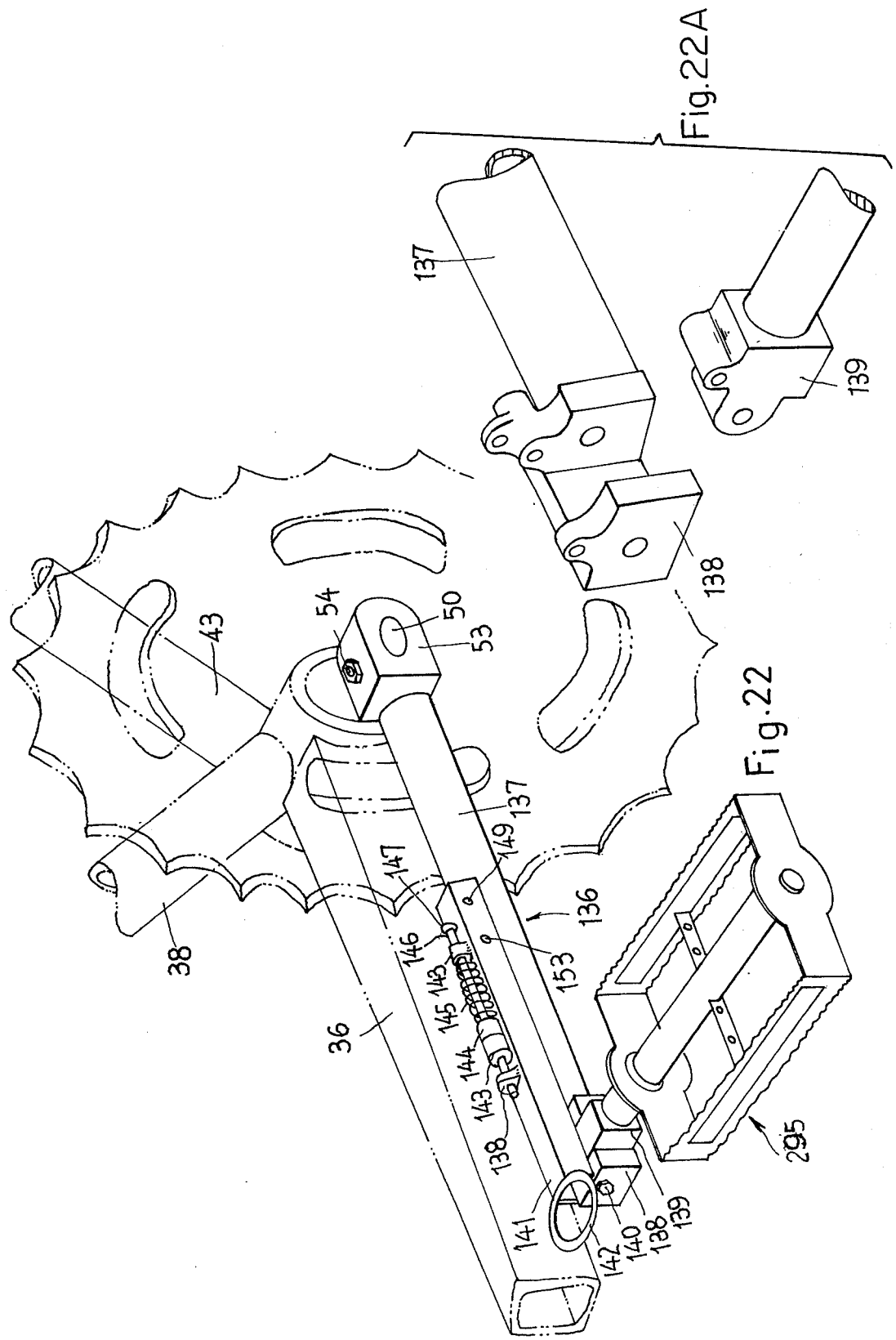

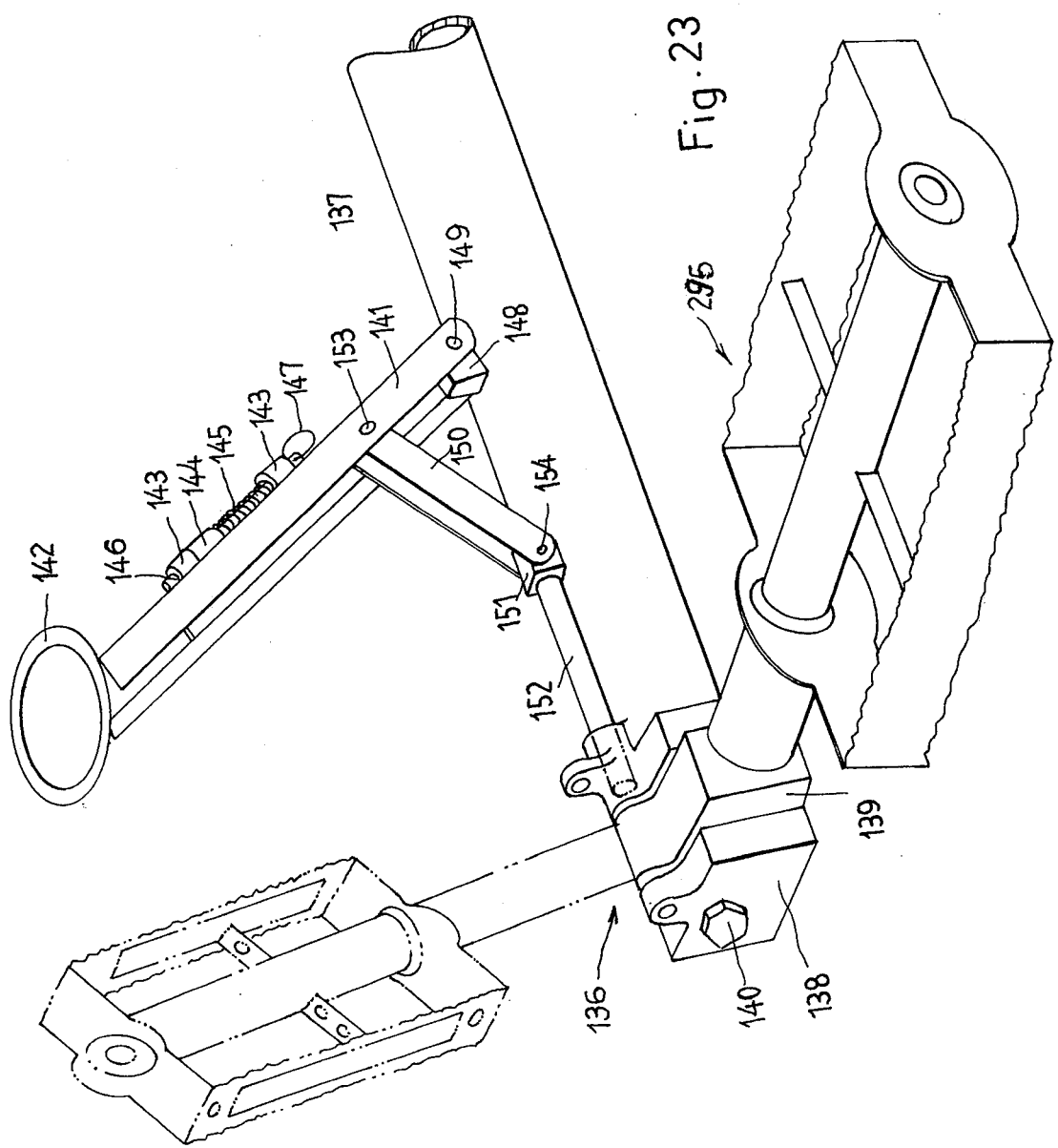

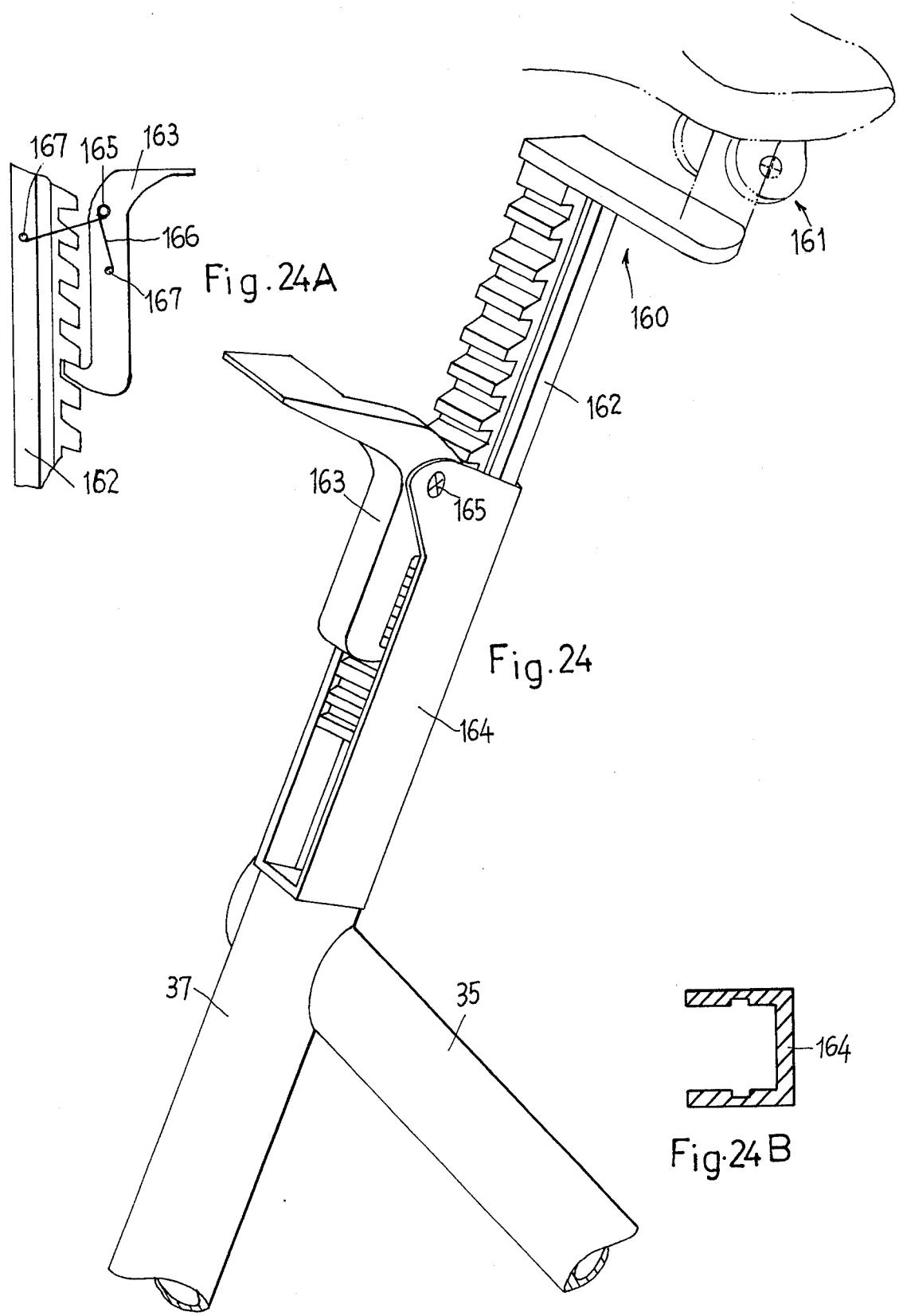

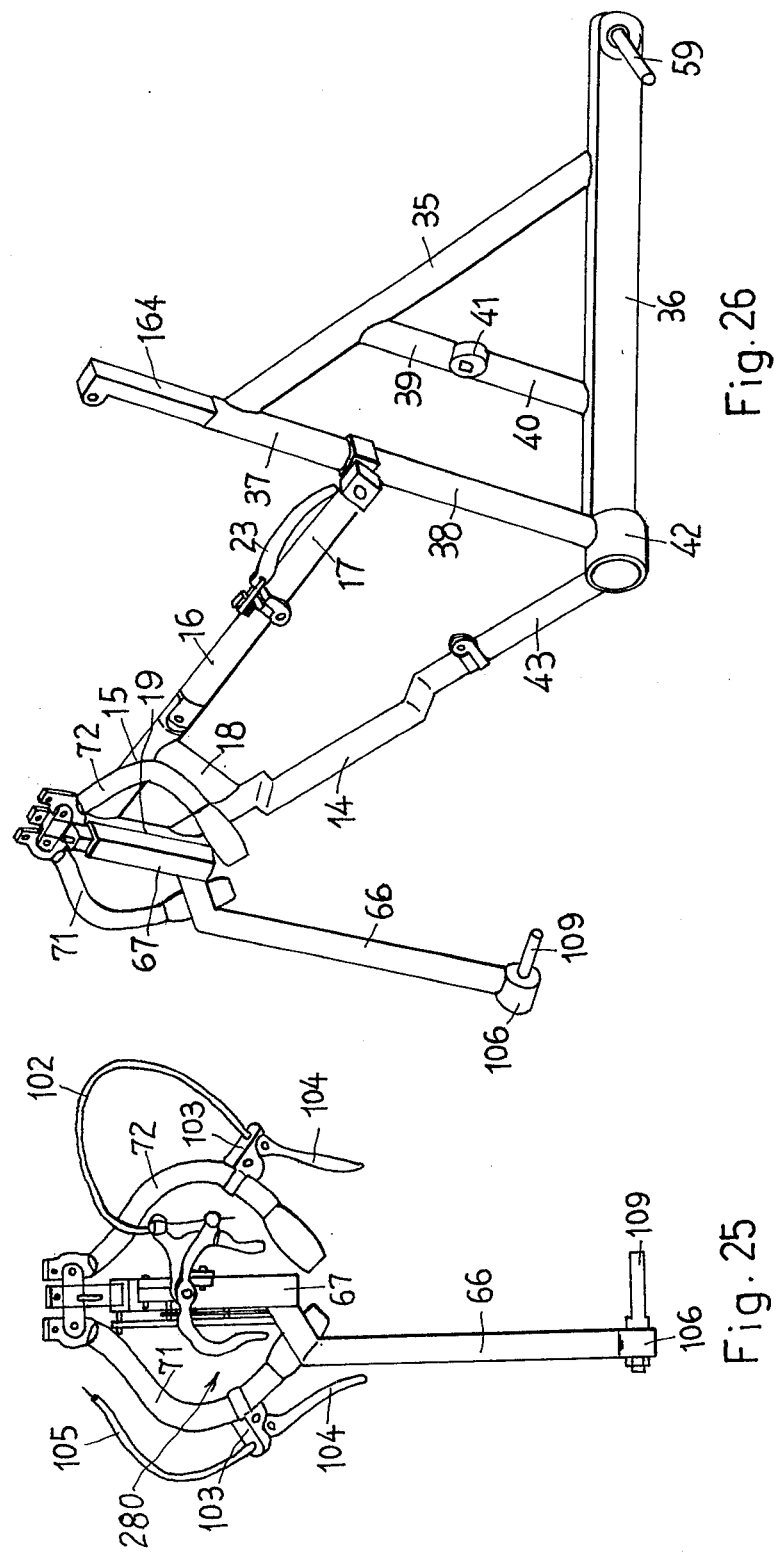

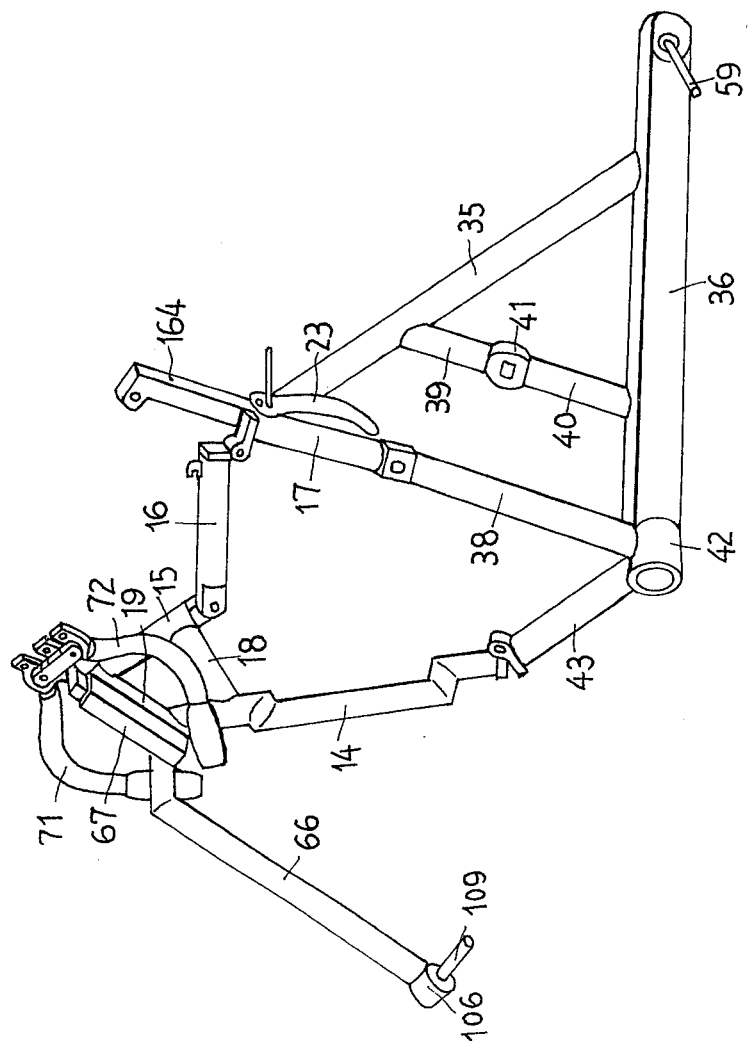

FOLDABLE BICYCLE

CROSS REFERENCE TO RELATED APPLICATIONS

This application is a continuation-in-part of a copending application for a Foldable Bicycle, Ser. No. 103,917, filed Dec. 17, 1979 now abandoned.

BACKGROUND OF THE INVENTION

The present invention relates to new and useful improvements in foldable bicycles, and more particularly to a hinged, foldable main frame, a removable and adjustable seat, two removable wheels, and an advantageous wheel-to-frame ratio.

It has been long observed that presently available foldable bicycles have many disadvantages.

Those having conventional, large wheels, cannot be folded into relatively small units due to their complicated structures. Because of the manner in which the frame members are jointed, these bicycles cannot be folded or opened quickly or efficiently by one individual.

The principal problem of presently available folding bicycles with small wheels is that the rider-to-frame ratio is not suitable for long rides or for adult riders. Although the small wheels of such bicycles facilitate their being folded into relatively small units, their center of gravity makes them less stable than conventional large-wheeled bicycles. Further, these small-wheeled bicycles do not provide a good strength-to-weight ratio.

The primary object of the present invention is to provide a foldable bicycle which can be easily and conveniently folded into a small portable unit due to the jointing of the frame. The size of this portable unit will be fully within that of the conventional standard wheel.

A further object of the present invention is to provide a bicycle that may be quickly, easily, and efficiently unfolded by one individual.

A further object of the present invention is to provide a bicycle which can be folded into a triangular configuration. By attaching the bicycle wheels to its opposing sides the configuration takes on a drum-like appearance. This drum-like unit is convenient and easy to carry, convenient and easy to push along the ground or transport in vehicles, and convenient and easy to store.

A still further object of the present invention is to provide a foldable bicycle with a standard frame configuration that is hinged and welded for folding. In this regard, it is an object of the present invention that the frame comprise over-center joints. Such joints augment an excellent strength-to-weight ratio and a stable center of gravity.

SUMMARY OF THE INVENTION

The present invention makes use of over-center jointing. Specifically the present invention includes two straight tubes hingedly connected with hinge means lying above the horizontal center of the connected tubes. In this over-center relationship, the hinge means prevent the tubes from folding away from each other. The hinge means must be forced away from its over-center position for the tubes to be moved apart.

The present invention relates to a foldable bicycle which comprises a main frame, a handlebar structure, a removable, adjustable seat structure, and two removable wheels. The main frame includes a front frame portion and a rear frame portion. The rear frame portion consists of one horizontal member mounted with a middle hub and a rear hub, six tubes, and one seat track. The rear frame is constructed in two parallel planes to form a rigid, triangular truss connected to an inclined tube. The truss section lies in a right parallel plane with respect to the inclined tube. The inclined tube is located in the bicycle's center plane.

The frong frame consists of an upper diagonal brace, a lower diagonal brace, and a steering column. The upper diagonal brace is connected by means of three tubes to a hinge screw, an over-center hinge pin, and a hinge block. The lower diagonal brace is comprised of a bent tube that is connected to the upper diagonal brace through a steering column and an inclined tube. The upper diagonal brace is located in the center plane of the bicycle, the center portion of the lower diagonal brace is located in the right parallel plane of the bicycle, and the two sides of the lower diagonal brace are located in the center plane of the bicycle. The front frame thereby looks like a foldable qradrangular truss formed in two parallel planes.

The front upper diagonal brace is hingedly connected to the aforementioned rear triangular truss by means of a hinge bolt which is located in the area of the center of the bicycle. In this manner, the rear triangular truss is located in a right parallel plane with respect to the center plane of the bicycle. The inclined tube which is connected to the rear truss, is also hingedly connected to the front lower diagonal brace through an over-center hinge pin. The relationship between the two frames causes the main frame to lie in three parallel planes.

By opening a front upper hook and then pulling the over-center hinged tubes up and away from their over-center position, all of the hinged tubes of the front frame can be folded with respect to the rear rigid frame. In folding the present bicycle, the hinge bolt acts as a central axis for the opposing rotation of the rear frame with respect to the front frame. Because the main frame tubes are jointedly connected in three parallel planes, the main frame can be folded into a triangular form. During such folding, the frame tubes fold into separate planes such that one tube does not obstruct the movement of another.

The handlebar is comprised of two handles, a front fork, and two handle columns. The handlebar is pivotally connected to a steering column through a steering bolt and includes an inner column and an outer column. After connecting the handlebar to the handle fitting by means of two hinge screws, the handle fitting is hingedly connected to the handle inner column through a hinge pin.

A fitting cam lock and a column lock rod retain the handlebar in operative relationship to the single fork, such that the front wheel can be rotated with respect to the steering column. Opening the fitting cam lock enables the handlebar to be turned upwardly through a 90 degree arc, and then rotated downwardly into a side-by-side relationship with the handle column.

The handle inner column is hingedly connected to the handle outer column. The forward brake assembly is hingedly connected to the handle outer column through a hinge screw and a hinge pin and is locked into position for riding by a quick release pin.

Upon removal of the quick release pin, the handlebar may be folded. Such folding action acts to move the forward brake assembly upwardly.

A single fork mounted with a front hub is weldingly connected to the handle outer column. A front wheel shaft is mounted through the front hub on the single fork. A front wheel is removably mounted on the front wheel shaft by means of a quick-release lock mechanism. Partially because the forward brake assembly can be moved above the front wheel and partially because of the location of the single fork, the front wheel can be removed from the front wheel shaft after removing the quick-release lock mechanism. The quick-release lock mechanism has three locking functions which enable the front wheel to be removed and reinstalled safely and quickly. These functions are discussed further in the detailed description that follows.

A rear brake mechanism is bracketed onto the rear frame tube. The rear brake assembly can be locked by a bracket pin during riding. During folding, the rear brake assembly can be pulled upwardly through a 90 degree arc to lie parallel with the center plane of the bicycle. The rear wheel shaft is mounted through a rear hub onto the rear truss. A rear wheel is removably mounted on the rear wheel shaft by means of a quick-release lock mechanism which is the same as that used on the front wheel. Since the rear brake assembly can be pulled up and away from its riding position, the rear wheel can be removed from the rear wheel shaft by removing the quick-lock release mechanism. The front and rear wheels and their respective quick-release lock mechanisms are interchangeable.

The seat structure comprises a seat assembly and a seat supporting member which may be locked into a plurality of positions. The seat assembly is mounted on the seat supporting member. A movable key hook is connected to the supporting member by means of a tensioned, steel wire. The key hook locks the seat assembly into one of a plurality of positions. The strength of the key hook lock is augmented by the steel wire and by rider weight on the seat. The seat structure can be adjusted or completely removed from the supporting member by releasing the key hook.

The left pedal structure includes a left pedal assembly, a left pedal link, and a swivel plate. The pedal assembly is connected to the swivel plate through the left pedal link. The whole left pedal structure is hingedly connected to the main sprocket shaft through a hinge pin and is locked into a riding position by a quick release pin. After the release pin has been pulled out, the left pedal assembly can be rotated through a 180 degree arc about the hinge pin.

The right pedal structure includes a right pedal assembly, a right pedal link, and a right pedal fitting. The right pedal link is connected to the right pedal fitting, and the right pedal assembly is hingedly connected to the right pedal fitting through a hinge screw. The whole right pedal structure is connected to the main sprocket. The right pedal assembly may be locked into a riding position by a lock mechanism. When the lock mechanism has been opened, the right pedal assembly can be rotated 90 degrees about the hinge bolt.

BRIEF DESCRIPTION OF THE DRAWINGS

The present invention shall be further described with reference to the following:

FIG. 3 is an enlarged perspective view of the center hinge of the front upper diagonal brace.

FIG. 4 is an enlarged perspective view of the over-center hinge of the front upper diagonal brace in its locked position.

FIG. 4A is a further view of FIG. 4 in an open position.

FIG. 5 is a top sectional view taken along the horizontal member of FIG. 2, and showing the middle hub and main sprocket.

FIG. 6 is a top horizontal sectional view taken along the horizontal member of FIG. 2., and showing the rear hub and rear sprocket.

FIG. 7 is a side sectional view of the front hub.

FIG. 8 is a side sectional view taken along the handle columns of FIG. 2 and showing the steering column.

FIG. 9 is a schematic drawing of the hinge block and showing the hinge bolt and seat assembly.

FIG. 9A is a further horizontal sectional view taken along the hinge bolt of FIG. 9.

FIG. 10 is an enlarged top view of the over-center hinge of the front lower diagonal brace.

FIG. 11 is a perspective drawing of the handlebar structure in an extended position, the retracted position being shown in phantom lines.

FIG. 11A is a view partially in section of the handle column.

FIG. 12 is a schematic drawing of the handlebar structure as connected to the main frame through the steering column.

FIG. 13 is a schematic drawing of the handlebar in locked position.

FIG. 13A is an enlarged view of the handlebar structure cam mechanism shown in FIG. 13.

FIG. 14 is a further perspective drawing of the handlebars in open position.

FIG. 15 is a schematic drawing of the rear brake assembly as connected to the rear frame of the foldable bicycle.

FIG. 16 is a schematic drawing of the rear brake assembly in its erected position, its folded position is shown in phantom lines.

FIG. 17 is a perspective drawing of the actual assembly.

FIG. 17A is a further view of FIG. 17 showing the front view of the inboard disk.

FIG. 18 is a perspective drawing of the front wheel shaft connected to a single fork.

FIG. 19 is a perspective drawing of the quick-release lock mechanism in open position.

FIG. 20 is a perspective drawing of the quick-release lock mechanism in locked position.

FIG. 21 is a perspective drawing of the left pedal structure in riding position.

FIG. 21A is a further view of FIG. 21 showing the swivel plate in its folded position.

FIG. 22 is a perspective drawing of the right pedal structure in its riding and locked position.

FIG. 22A is a further view of FIG. 22 showing the right pedal fitting.

FIG. 23 is a perspective drawing of the lock mechanism in its open position, the folded position being shown in phantom lines.

FIG. 24 is a perspective drawing of the seat structure in riding position.

FIG. 24A is a right side view of the key hook connected to the seat supporting member.

FIG. 24B is a sectional view of the supporting member in FIG. 24.

FIG. 25 is a front view of the folded handlebar structure in the prepared position with respect to the main frame before folding.

FIG. 26 is a schematic drawing illustrating the folded handlebar structure as turned to the center plane through a 90 degree arc with respect to the main frame before folding.

FIG. 27 is a schematic drawing showing the folded front frame portion rotated about the hinged bolt during folding.

DETAILED DESCRIPTION

The following is a detailed description of a preferred embodiment of the present invention.

Figure 1:
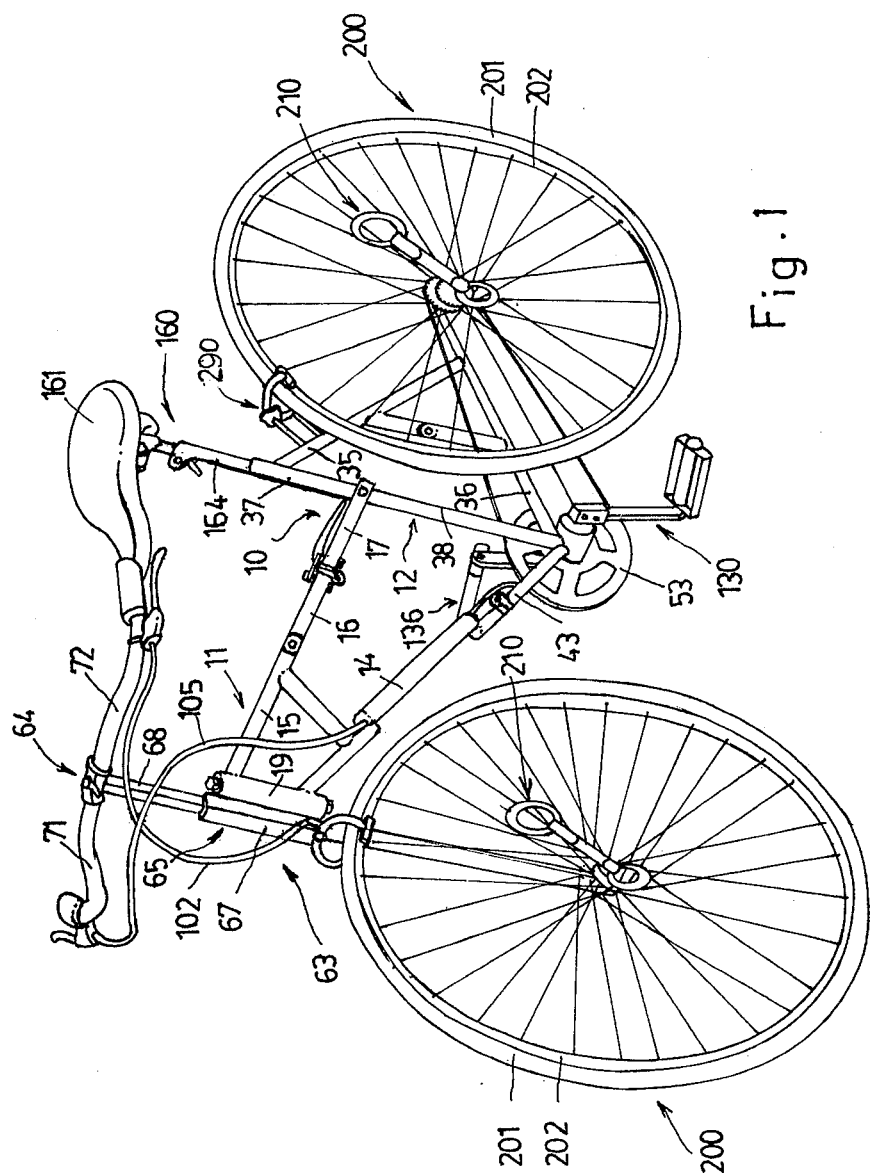
FIG. 1 is a perspective view of a bicycle in accordance with the present invention.

The relationship between the separated structure and the main frame 10, when fully erected, can be readily understood from FIG. 1.

Figure 2:
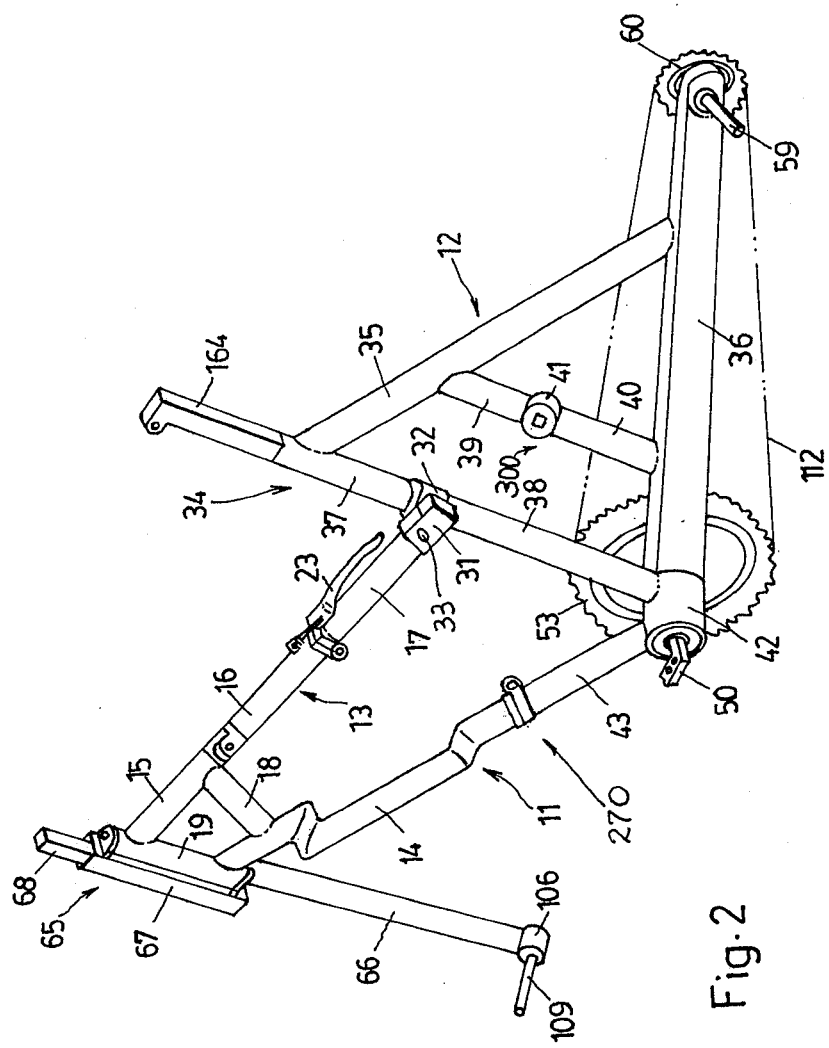
FIG. 2 is a perspective view of the main frame of the bicycle with the handle columns and the front single fork in an erected position.
Figure 28:
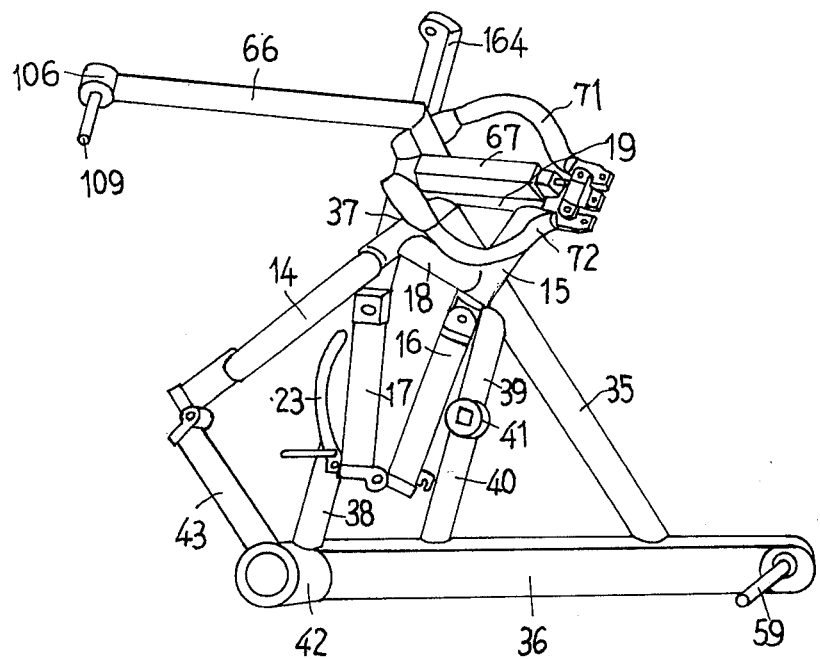
FIG. 28 is a further schematic drawing illustrating the further folding position of the front frame portion with respect to the rear-frame.
Figure 29:
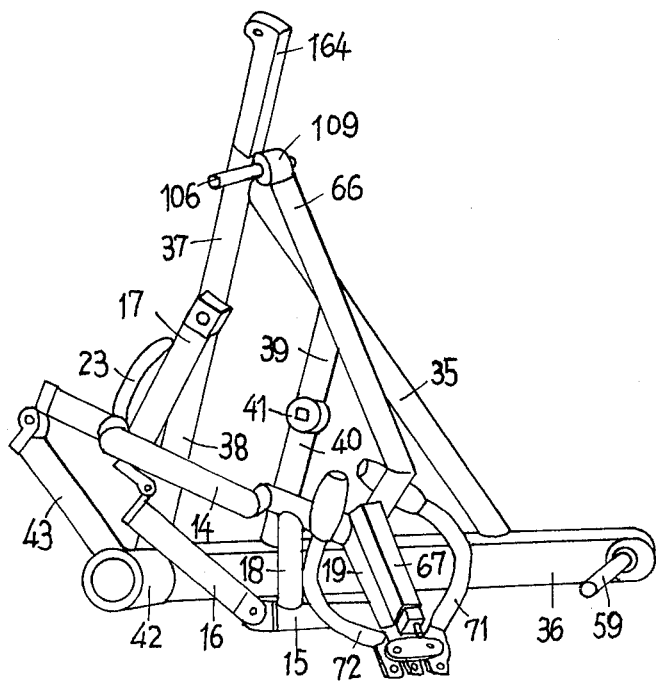
FIG. 29 is a further schematic drawing showing the final folding position of the main frame.
Figure 30:
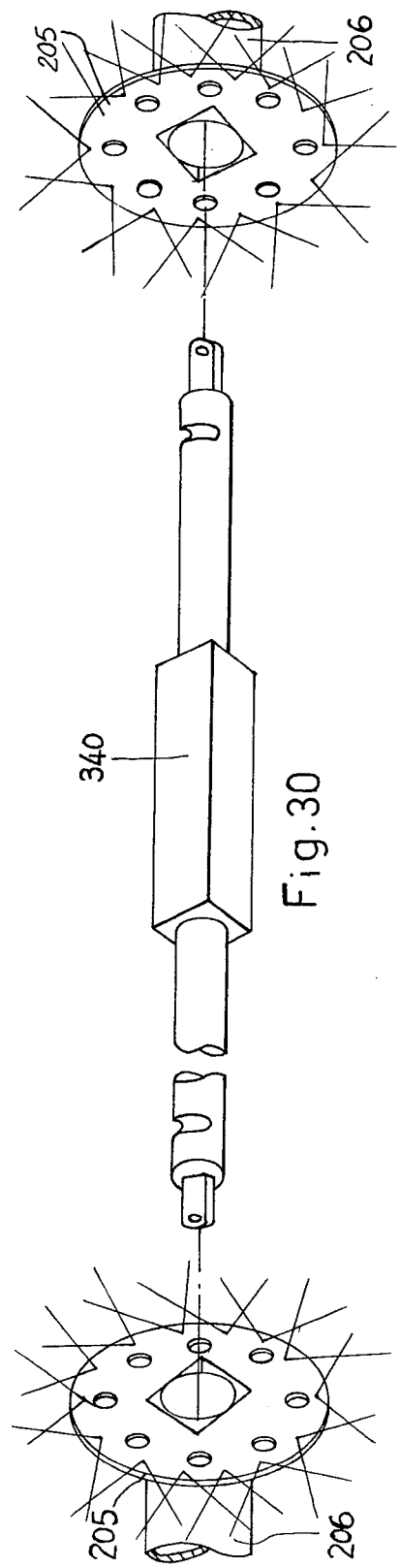
FIG. 30 is a perspective drawing of the wheel fixed shaft.
Figure 31:
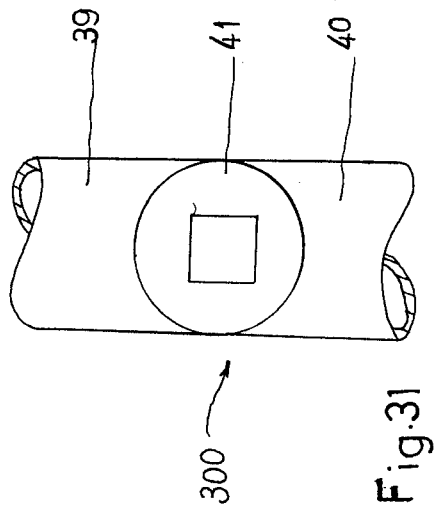
FIG. 31 is a front view of the wheel fixed fitting.

Referring to FIG. 2, the foldable bicycle includes a main frame 10 divided into a front frame portion 11 and a rear frame portion 12. It can be observed that the front frame portion 11 consists of an upper diagonal brace 13, lower diagonal brace 14, a front inclined tube 18, and a steering column 19. The front frame portion 11 is constructed such that the upper diagonal brace 13, the steering column 19, and the front inclined tube 18, are located in the center plane of the foldable bicycle. The leading section and the trailing section of the lower diagonal brace 14 are located in the bicycle's center plane. The central section of the lower diagonal brace 14 is located in the left parallel plane. Thus, the front frame portion 11 looks like a quadrangular truss that lies in two parallel planes. The upper diagonal brace 13 is comprised of a front tube 15, a middle tube 16, a rear tube 17 and a hinged block 31.

Rear frame portion 12 includes a horizontal member 36. A trailing edge tube 35 and a leading edge diagonal brace 34 connected to the horizontal member 36 form together a triangular truss. The leading edge diagonal brace 34 consists of a seat rack 164, a leading upper tube 37, a leading lower tube 38, and a hinge fitting 32. The hinge fitting 32 is located in the middle of the leading edge of diagonal brace 34 and connects rear frame portion 12 to the upper diagonal brace 13. The seat track 164 is mounted on the top of the leading diagonal brace 34. It acts as an extension and retraction track for seat assembly 161. A central brace 300 is connected to trailing edge tube 35 and to the horizontal member 36. The central brace 300 consists of a central upper tube 39, a lower tube 40, and a wheel fixed fitting 41. The wheel fixed fitting 41 has a square hole which permits the insertion of the fixed fitting shaft 340. Fixed fitting shaft 340 carries one bicycle wheel. The drive chain 112 is connected to main sprocket 53 and the rear sprocket 60.

The rear inclined tube 43 is connected to the middle hub 42 such that the rear inclined tube 43 is located in the bicycle's center plane, and the rear frame portion 12 is located in the bicycle's right parallel plane. The rear frame portion 12 thus looks like a rigid triangular truss with a rear inclined tube 43.

As illustrated in FIG. 2, FIG. 9, and FIG. 10 of the drawings, the rear frame portion 12 is hingedly connected to the upper diagonal brace 13 in the area of the hinge bracket 31, and is hingedly connected to the lower diagonal brace 14 by the rear inclined tube 43. After connecting the rear frame portion 12 to the front frame portion 11, it can be observed that rear frame portion 12 is located in the right parallel plane of the bicycle and that the front frame portion 11 is located in the center plane of the bicycle. The exception to the foregoing is that the central section of the lower diagonal brace 14 is located in the left parallel plane. Since the main frame 10 is located in three parallel planes, each of the tubes of the main frame can be folded without obstructing the other tubes.

Referring to FIG. 3, the front tube 15 is connected to the middle tube 16 through a center hinge 250. Column 20 is inserted into the fluted column 21 through a hinge screw 22 to form the center hinge 250. Referring to FIGS. 4 and 4A the rear tube 71 is connected to the middle tube 16 through an over-center hinge 260. The front hinge plate 26 is connected to the rear hinge plate 27 through an over-center hinge pin 28 to form the over-center hinge 260. As shown in FIG. 4A hinge pin 28 lies under the center line of tubes 16 and 17. In this way tubes 16 and 17 may only be folded away from each other by moving hinge 260 upwardly.

The upper lock mechanism consists of a hook bar 23 and a "U" hook 24. The hook bar 23 is hingedly connected to the hook block 30 through the hinge pin 29. The "U" hook can be swung downwardly to be inserted into the lock block 25 to lock over-center hinge 260 as shown in FIG. 4. The over-center hinge is held in a closed position by the upper lock mechanism thereby forming a rigid diagonal brace between members 16 and 17 when the bicycle is in its erected position.

Referring to FIG. 5, it can be observed that middle hub 42 is mounted on the horizontal member 36 such that the middle hub 42 is perpendicular to the horizontal member 36. Two ball bearings 49 are inserted into both sides of the middle hub 42. The main sprocket shaft 50 is mounted on the middle hub 42 passing through jam nut 51 and the spacer 52. The main sprocket 53 is mounted on the right edge of the main sprocket shaft 50 and locked by a taper pin 54. The jam nut 51 can be adjustably tightened to lock the main sprocket shaft 50. It also can be observed that the rear inclined tube 43 and the horizontal member 36 are not in the same plane.

Referring to FIG. 6, the rear hub 55 is mounted on the horizontal member 36. The roller bearing 56 is inserted into the rear hub 55. The rear wheel shaft 59 is mounted on the rear hub 55 passing through the left washer 57 and the right washer 58. The rear sprocket 60 is mounted on the rear wheel shaft 59 and locked by a nut 61 with cotter pin 62.

Referring to FIG. 7, a front hub 106 is connected to the single front fork 66. The roller bearing 107 is inserted into the front hub 106. The front wheel shaft 109 is mounted on the front hub 106 passing through the roller bearing 107 and locked by nut 110 with cotter pin 111.

From FIG. 6 and FIG. 7, it can be observed that the rear wheel shaft 59 and the front wheel shaft 109 are similar. These wheel shafts enable the easy removal of the wheel and improve the transmittal of power to the wheel.

Referring to FIG. 8, it can be observed that the upper connector 93 and lower connector 94 connect the handle outer column 67 to the steering column 19 through the steering bolt 97. The two washers 96 and the two bushings 95 are mounted on steering column 19 to enable the easy rotation of the handle outer column 67 about the steering column 19.

The hinge bolt 33 (shown in FIGS. 9 and 9A) is connected to hinge block 31 and hinge fitting 32. It is there locked by nut 44 with cotter pins 45. Hinge bolt 33 acts as a hinge axis for the opposing rotation of front frame portion 11 and rear frame portion 12.

As illustrated in FIG. 10, the leading plate 46 is connected to the trailing plate 47 through a hinge pin 48 to form the over-center hinge 270. The over-center hinge 270 connects the rear inclined tube 43 to the lower diagonal brace.

Referring to FIG. 11, the handlebar structure comprises the right handlebar 71, the left handlebar 72, handle inner column 68, the handle outer column 67, and single front fork 66. The handle inner column 68 is inserted and connected to the handle outer column 67 by the upper link 80 and the lower link 81 through hinge screw 82, hinge screw 84, and hinge pin 83. The forward brake assembly 280 consists of the right arm 99 and the left arm 101 and rubberized parts 100.

The central fitting 86 is mounted on the handle outer column 67 in a longitudinally low, central position. The angle fitting 89 is mounted on the handle outer column 67 above and to the right of central fitting 86. The brake assembly 280 is connected to the central fitting 86 by a supporting rod 91. The central link 87 is hingedly connected to the central fitting 86 through hinge pin 88 and is hingedly connected to the angle fitting 89 through hinge screw 90. The lower link 81 is hingedly connected to the central fitting 86 through hinge screw 85. Due to the above relationship, the handle inner column 68 can be retracted into handle outer column 67 since the hinge pin 83 acts as a joint and the hinge screw 84 acts as a supporting point. In this regard reference is made to the phantom lines found in FIG. 11.

The forward brake assembly 280 is moved upwardly in conjunction with the downward movement of the handle inner column 68 by means of the relative movement of the central fitting and the central link (refer to the phantom lines of FIG. 11). Quick release pin 92 is inserted through the lower link 81 and central fitting 86 to lock the forward brake assembly and handle inner column 68 in their locked positions. By pulling out the quick-release pin, the handle inner column 68 and forward brake assembly 280 can be moved.

Handlebar structure 63 and steering column 19 are depicted in FIG. 12 and FIG. 13A. The cam lock 79 with lock bar 75 is mounted on the handle fitting 73 through angle fitting 78. As shown in FIG. 13, the cam lock 79 with lock bar 75 can be pushed down over column rod 70 to bring left handlebar 72 and right handlebar 71 into position for riding.

Referring to FIGS. 13 through 14, right handlebar 71 and left handlebar 72 are connected to the handle fitting 73 by means of hinge screw 74. A fitting plate 69 is mounted on the top of handle inner column 68. The handlebar 64 can be rotated upwardly since it is hingedly connected to the fitting plate 69 through hinge pin 76. Also the left handlebar 72 and the right handlebar 71 can be swung downwardly in a side-by-side relationship to the handle inner column 68 by means of hinge screw 74 (as illustrated in FIG. 14).

The relationship between rear brake mechanism 290 and rear wheel 200 can be readily understood from FIG. 15. Referring to FIG. 16, the track bracket 114 is mounted on the trailing edge tube 35 and locked in that position by nuts 115. The rear brake assembly 113 including rear brake cable 105, left arm 123, right arm 124, adjustable screw 125, and the cable tightening screws are mounted on swivel link 120 through supporting rod 121 and locked by nut 122. The swivel link 120 is connected to the slide link 116 and locked in that position by pin 119. The rear brake assembly 113 can be pulled up and swung to the right by means of guide pin 118 guiding the slide link 116 along the track of bracket 114.

The wheel assembly 200 includes disk assembly 203, tire 201, and wheel 202 (as shown in FIG. 1). The disk assembly 203 consists of an outboard disk 204, inboard disk 205, and axle 206. The wheel assembly 200 can be rigidly connected to the front wheel shaft 109 by means of inboard disk 205. Inboard disk 205 defines a square hole in its center portion that rigidly connects to the square block of the front shaft 109 (shown in FIGS. 17 and 17a). The relationship between front wheel shaft 109 and quick-lock release mechanism 210 can be readily understood from FIGS. 17 through 20.

The quick-release lock mechanism 210 consists of lock member 211, latch 212, lock member bar 213, and latch bar 217. Block 223 is mounted in the rear portion of the lock member 211. The guide sleeve 216 is mounted in the middle portion of lock member 211. The leading sleeve 215 is mounted in the front portion of lock member 211. The latch 212 is hingedly connected to the block 223 by means of hinge pin 224. The slide block 227 connects the slide link 229 to the "U" connector 226 by means of pin 228. The "U" connector 226 is connected to the latch by pin 225 (as shown in FIG. 19).

The quick-release lock mechanism 210 provides a triple lock function with respect to front wheel assembly 200. The first function takes place by the insertion of the fix pin 214 into the skewed and fluted slot of the front wheel shaft 109 to prevent lock member 211 from slipping away from front wheel shaft 109. The second function occurs when slide link 229 is passed through the keyhole of the front wheel shaft 109 into the leading sleeve 215 at the time of closing latch 212 of lock member 211. In closing 212, lock member 211 and front wheel shaft 109 are rigidly joined. The third function occurs when shaft pin 221 is manually inserted into trailing sleeve 230 by pulling and releasing spring 220. Latch 212 is thus prevented from slipping away from lock member 211.

The open position and locked position of the quick-release lock mechanism 210 are each separately shown in FIGS. 19 and 20 respectively.

Referring to FIG. 21, the left pedal structure 130 including the left pedal assembly 131, the left pedal link 132, and the swivel plate 133 is shown. The left pedal assembly 131 is connected to the swivel plate 133 through the pedal link 132. The swivel plate 133 is hingedly connected to the main sprocket shaft 50 through the hinge pin 135. The swivel plate can be rotated about the main sprocket shaft 50 through a 180 degree arc (as shown in FIG. 21A). The left pedal structure can be locked into riding position by quick-release pin 134.

Referring to FIG. 22, the right pedal structure 136 comprises a right pedal link 137, a right pedal fitting 138, and a right pedal assembly 295. The right pedal assembly is connected to the swivel fitting 139. The right pedal fitting 138 is connected to the main sprocket 53 through the right pedal link 137. The right pedal assembly can be rotated through a 90 degree arc about the hinge bolt 140. At the conclusion of such rotation the pedal assembly lies in a right parallel plane with respect to the bicycle (shown in FIG. 23). The slide link 152 can be slid into the two fixed holes of the right pedal fitting 138 through the upper fixed hole of the swivel fitting 139. This is done in conjunction with the downward movement of the lock member 141. The safety holding pin 146 can be manually inserted into the upper fixed hole of the right pedal fitting 138 by means of the spring 145.

The relationship between seat structure 160 and seat track 164 are shown in FIGS. 24 and 24B. The seat assembly 161 is connected to the seat supporting member 162. The seat structure 160 can be inserted into seat track 164 and locked into one of a plurality of positions by key hook 163. Key hook 163 is connected to the supporting member 164 through the torsion of spring 166 by hinge screw 165 and pin 167.

To fold the bicycle, seat structure 160 can be removed from seat track 164 and the two wheel assemblies 200 can be removed from front wheel shaft 109 and rear wheel shaft 59. The left pedal assembly 131 can be folded into the center plane of the bicycle and the right pedal assembly 295 can be folded into the right parallel plane of the bicycle. The foldable bicycle can then be folded into a triangular body which lies in three parallel planes. (FIGS. 25 through 29 should be noted).

The folding of main frame 10 with handlebar structure 63 can be readily understood from FIGS. 25 through 29. After the quick-release pin 92 has been pulled out, the handlebar 64 can be pushed down. The cam lock 79 must then be opened to enable the handlebar 64 to be turned upwardly and then moved downwardly into a side-by-side relationship with the handle column 67. (A front view of the handlebar structure in FIG. 25 is illustrative of this position.) Handlebar structure 63 is then moved through a 90 degree arc to the left. Handlebar structure 63 and lower diagonal brace 14 may be moved in conjunction with each other. FIG. 26 is illustrative of this relationship.

By opening the upper hook and pulling the upper, over-center hinge away from its over-center position, the tubes of the front frame portion 11 may be folded. Specifically the front frame portion 11 must be rotated about the hinge bolt 33. FIG. 27 is illustrative of this relationship.

Since the rear frame portion 12 is located in the right parallel plane with respect to the front frame portion 11, the front frame portion 11 and the handlebar structure 63 can be rotated to the front of the rear frame portion 12. The final relationship between the handlebar structure 63 and rear frame portion 12 can be readily understood from FIGS. 28 through 29.

Figure 33:
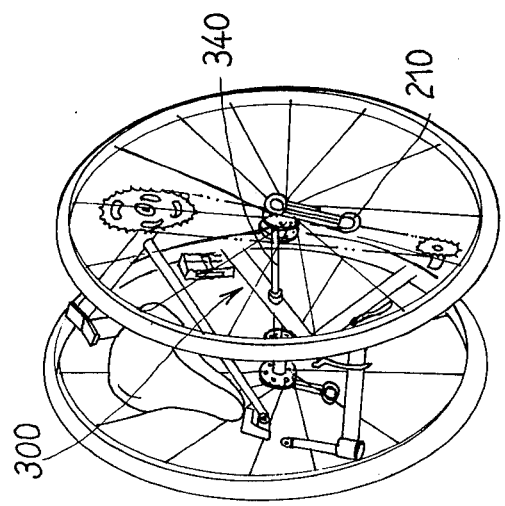
FIG. 33 is a schematic drawing of the foldable bicycle in its final folded position.
Figure 32:
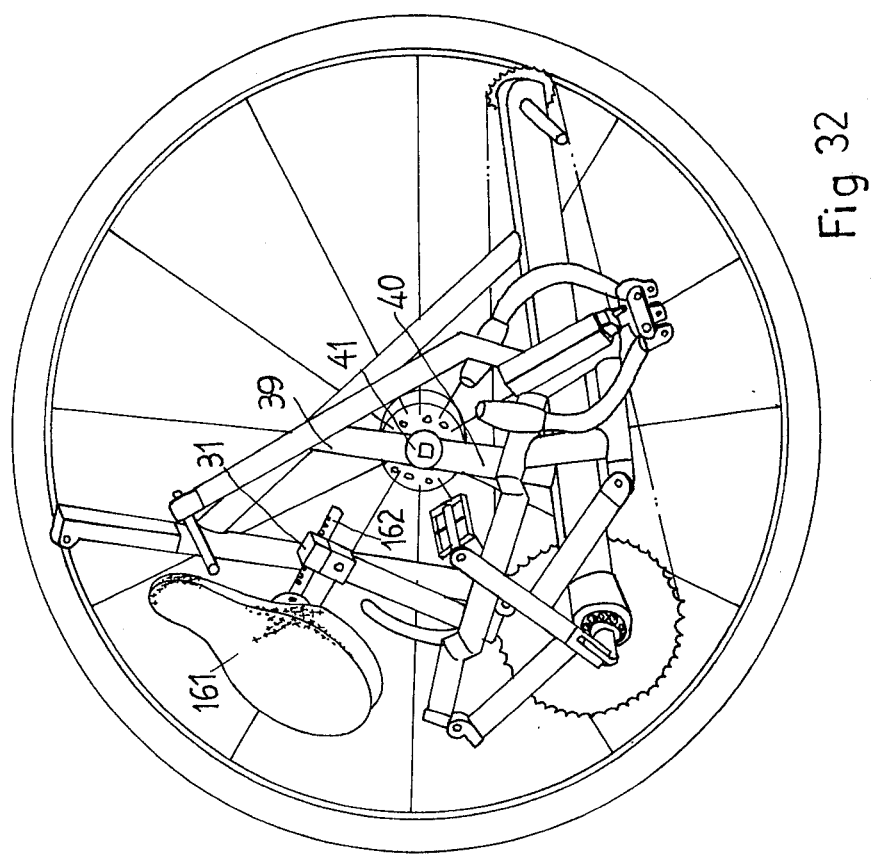
FIG. 32 is a schematic drawing showing the seat assembly and the wheel reinstalled on the folded main frame.

The wheel fixed shaft 340 can be inserted into wheel fixed fitting 41. This relationship enables the wheel assembly 200 to be reinstalled on wheel fixed shaft 340 and locked by quick-release lock mechanism 210. Upon reinstalling the seat structure 160 on hinge block 31, the bicycle is in its completely folded position. The folded bicycle is fully within the size of the conventional tire 201 and looks like a drum. FIGS. 32 through 33 are illustrative.

What is claimed:

1. A foldable bicycle which comprises: a handlebar structure; a front frame portion comprised of an upper diagonal brace, a lower diagonal brace, a front inclined tube bridging said upper and lower diagonal braces, and a steering column, said steering column being connected to said handlebar structure and forming with said upper and lower diagonal braces a triangular form; a rear frame portion; a hinge bolt, said hinge bolt axially connecting said rear frame portion to said front frame portion; said handlebar structure having a steering bolt and being connected to said front frame portion by said steering bolt; a seat structure connected to said rear frame portion; a right and left pedal structure, said right and left pedal structure being opposingly connected to said rear frame portion; a front wheel assembly and a rear wheel assembly, said front and rear wheel assemblies each having brake mechanisms connected thereto, said front wheel assembly being removably connected to said handlebar structure, said rear wheel assembly being removably connected to said rear frame portion; and at least one over-center hinge for hingedly connecting said rear frame portion to said front frame portion, whereby upon removal of said wheel assembly and said seat structure from said foldable bicycle, said front frame portion can be folded by means of said over-center hinge and said hinge bolt into a small triangular unit.

2. The foldable bicycle of claim 1, wherein a center hinge and said over center hinge are mounted on said front frame portion enabling said upper and lower diagonal braces of said front frame portion to fold.

3. The foldable bicycle of claim 1, wherein said upper diagonal brace includes an upper lock mechanism comprised of a hook bar; a "U" hook; a lock block; a hook block; and a hinge pin; said hook bar being rotatably connected to said hook block by means of said hinge pin, whereby said hook bar may be rotated into a locking position with said lock block such that said upper lock mechanism lies over said over-center hinge and braces said upper diagonal brace.

4. The foldable bicycle of claim 1, wherein said rear frame portion is triangular in shape and comprised of a rear inclined tube.

5. The foldable bicycle of claim 4, wherein said rear frame portion further includes means for releasably connecting to said rear wheel assembly.

6. The foldable bicycle of claim 1, wherein said seat structure is comprised of a seat; a seat track; a seat supporting member; and a seat assembly; said seat assembly being connected to said seat supporting member, said seat supporting member being carried by said seat track.

7. The foldable bicycle according to claim 6, wherein said seat supporting member is adjustable in and removable from said seat track.

8. The foldable bicycle according to claim 7, further including locking means wherein said seat supporting member is adjustably and removably held within said seat track by said locking means connected to said seat track.

9. A foldable bicycle according to claim 8, wherein said seat supporting members defines a plurality of linear grooves for receiving said locking means such that said supporting member may be linearly adjusted to any one of a plurality of positions by engagement of said supporting member with said locking means.

10. The foldable bicycle of claim 1, wherein said handlebar structure is comprised of a pair of rotatable handlebars connected to a retractable inner column; and a time which connects to said handle inner column and extends downwardly therefrom to said removable front wheel.

11. The foldable bicycle of claim 10, wherein said handlebar structure further includes a column rod and a cam lock for releasably retaining said rotatable handlebars in position for riding.

12. The foldable bicycle of claim 10, wherein said handlebar structure further includes a handle fitting hingedly connected to a fitting plate, said fitting plate connecting to said retractable handle inner column and enabling the handlebars to be rotated through a 90° arc.

13. The foldable bicycle of claim 10, wherein said inner column lies within a handle outer column and is connected thereto by linking and connecting means, said inner column being capable of being retracted into said outer column.

14. The foldable bicycle of claim 10, wherein said front brake mechanism is comprised of a brake assembly connected to a central fitting; a central link and a lower link, said central link and said lower link being connected to opposing sides of said central fitting, said lower link being connected to said handle inner column; and an angle fitting connecting said central link to said handle outer column whereby said brake moves in response to linear movement of said handle inner column.

15. The foldable bicycle of claim 14, wherein said front brake mechanism further includes a quick release pin which passes through said lower link and said central fitting to lock said handle inner column and said front brake assembly in position for riding.

16. The foldable bicycle of claim 1, wherein said rear brake mechanism is comprised of a bracket connected to said rear frame portion; a slide link carried in said bracket; and a guide pin for guiding said slide link within said bracket, said bracket facilitating attachment and removal of said rear wheel.

17. The foldable bicycle of claim 16, wherein said slide link may be rotated upwardly through a 90° arc.

18. The foldable bicycle of claim 1, wherein said pedal structure is comprised of a left pedal assembly connected to a left pedal link; a swivel plate; and a main sprocket shaft, said swivel plate being connected to said left pedal link and being hingedly connected to said main sprocket shaft such that said swivel plate can be rotated in a 180° arc about said main sprocket shaft during the folding of the foldable bicycle.

19. The foldable bicycle of claim 1, wherein said right pedal structure is comprised of a right pedal assembly hingedly connected to a right pedal fitting; a right pedal link; and a main sprocket, said right pedal link being connected to said main sprocket and said right pedal fitting such that said right pedal assembly can be rotated about a 90° arc during the folding of the bicycle.

20. The foldable bicycle of claim 1 further including a quick release lock mechanism being comprised of a lock member hingedly connected to a latching means, said lock member having means for engageably connecting to a wheel shaft, said lock member further defining in its surface an opening for receipt of said wheel shaft; a slide link movable connected to said lock member, said slide link being linearly movable through an opening defined in said wheel shaft when said shaft is received in said opening of said lock member, said latching means being formed for receipt of said lock member and said slide link such that upon movement of said latching means over said lock member and said slide link, said latching means may be secured to said slide link whereby said quick release lock mechanism provides three locking functions.

21. A quick-lock release mechanism having a triple lock function, said quick lock release mechanism for use in the removable locking of a wheel to a wheel shaft and comprising: a lock member; a fixed pin attached to said lock member, said fixed pin being insertable into a slot defined in said wheel shaft to provide a first locking function; a latch pivotally attached to said lock member; a slide link lying inwardly of said latch; and a sleeve lock lying colinear of said slide link where movement of said latch toward said fixed pin causes said slide link to slide through an opening defined in said wheel shaft and into said sleeve lock thereby providing a second locking function; a shaft pin slidably attached to said latch; and a trailing sleeve attached to said lock member wherein said shaft pin is received in said trailing sleeve when said latch is brought toward said fixed pin to provide a third locking function.

* * * * *